(12) United States Patent
Yu et al.

(10) Patent No.: US 12,007,606 B2
(45) Date of Patent: Jun. 11, 2024

(54) RING RESONATOR AND MANUFACTURING METHOD THEREOF

(71) Applicant: Korea Advanced Institute of Science and Technology, Daejeon (KR)

(72) Inventors: Kyoungsik Yu, Daejeon (KR); Gyeongho Son, Daejeon (KR); Mohamad Syahadi, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 643 days.

(21) Appl. No.: 17/172,416

(22) Filed: Feb. 10, 2021

(65) Prior Publication Data

US 2021/0239907 A1    Aug. 5, 2021

(30) Foreign Application Priority Data

Dec. 12, 2019   (KR) .................. 10-2019-0165431
Dec. 14, 2020   (KR) .................. 10-2020-0174901

(51) Int. Cl.
G02B 6/293      (2006.01)
G02B 6/10       (2006.01)
G02B 6/245      (2006.01)
G02B 6/255      (2006.01)
H01P 7/08       (2006.01)
H01S 3/106      (2006.01)

(52) U.S. Cl.
CPC .............. *G02B 6/2934* (2013.01); *G02B 6/10* (2013.01); *G02B 6/245* (2013.01); *G02B 6/255* (2013.01); *H01P 7/082* (2013.01); *H01S 3/1062* (2013.01)

(58) Field of Classification Search
CPC ........ G02B 6/2934; G02B 6/10; G02B 6/245; G02B 6/255; H01P 7/082
See application file for complete search history.

(56) References Cited

U.S. PATENT DOCUMENTS

| | | | | |
|---|---|---|---|---|
| 10,666,010 B1 * | 5/2020 | Näppi | ................. | H01S 3/06745 |
| 2002/0037132 A1 * | 3/2002 | Sercel | ................ | G02B 6/02052 |
| | | | | 385/50 |
| 2004/0197051 A1 * | 10/2004 | Sercel | ..................... | G02F 1/225 |
| | | | | 385/39 |
| 2013/0319123 A1 * | 12/2013 | Wang | ................... | A61B 5/0095 |
| | | | | 73/655 |
| 2016/0327743 A1 | 11/2016 | Kippenberg et al. | | |

FOREIGN PATENT DOCUMENTS

| | | | | | |
|---|---|---|---|---|---|
| CN | 202869696 U | * | 4/2013 | ............. | G01K 11/32 |
| KR | 10-0759940 B1 | | 9/2007 | | |
| KR | 101419910 B1 | * | 7/2014 | ................ | G02B 6/02 |
| KR | 101419910 B1 | | 7/2014 | | |
| WO | WO-0216986 A1 | * | 2/2002 | ........ | B23K 26/0823 |

OTHER PUBLICATIONS

Office Action dated Apr. 13, 2023, in corresponding Korean Application No. 10-2020-0174901; 6 pages.

* cited by examiner

*Primary Examiner* — Tarifur R Chowdhury
*Assistant Examiner* — Kemaya Nguyen
(74) *Attorney, Agent, or Firm* — Maier & Maier, PLLC

(57) ABSTRACT

A ring resonator includes a core. Both ends of the core in a lengthwise direction are connected to have a circular shape. The ring resonator further includes a cladding surrounding the core, a jacket surrounding the cladding and a sleeve surrounding a portion of the jacket. A portion of the core is exposed from the cladding and the jacket.

7 Claims, 13 Drawing Sheets

RING RESONATOR AND MANUFACTURING METHOD THEREOF

TECHNICAL FIELD

The present disclosure relates to a ring resonator and a method of manufacturing the same and, more particularly, to an optical-fiber-based ring resonator having a high-performance Q factor and a method of manufacturing the same.

BACKGROUND

A resonator is a device in which external energy is concentrated to exhibit resonance at a specific frequency. The resonator may have various shapes. Among these resonators, a ring resonator can change a wavelength using a minute voltage signal. The ring resonator generates a frequency that varies depending on a diameter of the ring resonator.

However, there is a problem in that it is not easy to manufacture the ring resonator that has a diameter in units of mm and supports a frequency in units of giga.

In the related art, in a case where a resonator is manufactured using an optical fiber, such a resonator has supported a frequency only in units of mega. In order to support a frequency in units of giga, the resonator has been manufactured using an integrated circuit semiconductor device that uses silicon, instead of using the optical fiber. In a case where the resonator is manufactured using the integrated circuit semiconductor device, there is a problem in that the resonator has low applicability, for example because a manufacturing process costs up to tens of millions won.

An example of the related art is Korean Patent No. 10-0759940 (Sep. 12, 2007).

SUMMARY

In view of the above, the present disclosure provides a resonator that has a size in units of mm and supports a frequency in units of giga.

Furthermore, the present disclosure provides a small-sized optical-fiber-based ring resonator having high-efficiency Q factor, which is manufactured using a simple low-cost manufacturing process.

In accordance with a first aspect of the present disclosure, there is provided a ring resonator including: a core, wherein both ends of the core in a lengthwise direction are connected to have a circular shape; a cladding surrounding the core; and a jacket surrounding the cladding, wherein a portion of the core is exposed from the cladding and the jacket.

The ring resonator may further include a sleeve surrounding a portion of the jacket.

The ring resonator may further include a shrinking sleeve that is arranged to surround a portion where the both ends of the core are connected to each other.

The shrinking sleeve may be inserted and fitted to the jacket.

In accordance with a second aspect of the present disclosure, there is provided a method of manufacturing a ring resonator, the method including: removing portions of a jacket, which are arranged on both ends and a central portion of an optical fiber, wherein the optical fiber includes a core having a predetermined length, a cladding surrounding the core, and the jacket surrounding the cladding; connecting the both ends of the optical fiber; and etching the cladding arranged in the central portion of the optical fiber from which the portion of the jacket is removed.

The method may further include inserting two sleeves to surround a remaining portion of the jacket, before the connecting of the both ends of the optical fiber.

The method may further include providing a shrinking sleeve to surround a portion where the both ends of the optical fiber are connected.

The etching of the cladding may include etching the cladding using an aqueous solution of hydrofluoric acid.

The aqueous solution of hydrofluoric acid may have a concentration of 49%.

In the etching of the cladding, the cladding may be etched so that the etched cladding has a diameter of 10 μm or less.

The optical fiber may have a length of about 80 mm, each of the portions of the jacket that are removed at the both ends of the optical fiber may have a length of about 5 mm, and the portion of the jacket, which is removed at the central portion of the optical fiber, may have a length of about 20 mm.

The sleeve may have a length of about 11 mm.

According to an embodiment of the present disclosure, the ring resonator is manufactured using a single mode optical fiber. Thus, there is an advantage in that the resonator having a high Q factor can be manufactured.

DETAILED DESCRIPTION OF THE EMBODIMENTS

Figure 1:
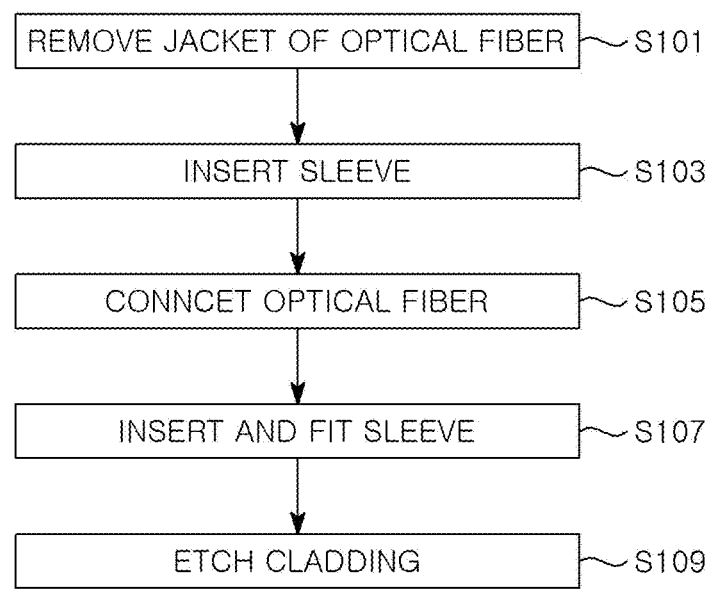
FIG. 1 is a flowchart illustrating a method of manufacturing a ring resonator according to an embodiment of the present disclosure.

Hereinafter, a preferred embodiment of the present disclosure for implementing the spirit of the present disclosure will be described in more detail with reference to the accompanying drawings.

However, in describing the present disclosure, detailed descriptions of known configurations or functions may be omitted to clarify the present disclosure.

When an element is referred to as being 'connected' to, 'supported' by, 'accessed' by, 'supplied' to, 'transferred' to, or 'contacted' with another element, it should be understood that the element may be directly connected to, supported by, accessed by, supplied to, transferred to, or contacted with the other element, but that other elements may exist in the middle.

The terms used in the present disclosure are only used for describing specific embodiments, and are not intended to limit the present disclosure. Singular expressions include plural expressions unless the context clearly indicates otherwise.

The terms above or over, below or under, lateral surface, and the like are defined with respect to a constituent element illustrated in the drawing. It should be noted in advance that, when the direction of the illustrated constituent element is changed, the terms used are accordingly changed. For the same reason, a constituent element is illustrated in an exaggerated or schematic manner in the accompanying drawings, or is omitted therefrom. Constituent elements illustrated therein have not necessarily been drawn to scale.

In addition, the terms first, second, and so on may be used herein to describe various constituent elements, but do not impose any limitation on the various constituent elements. These terms are used only to distinguish one constituent element from another.

The term "include," which is used in the present application, is intended to specify a specific feature, an area, an integer, a step, an operation, a constituent element, and/or a component, and therefore does not preclude the possibility that one or more specific features, areas, integers, steps, operations, constituent elements, and/or components will be present or added.

A ring resonator 10 and a method of manufacturing the ring resonator 10 according to an embodiment of the present disclosure will be described with reference to FIGS. 1 to 16. According to the present embodiment, the ring resonator 10 is manufactured using an optical fiber 100. The optical fiber 100, as illustrated in FIG. 2, includes a core 110, a cladding 120, and a jacket 130.

The core 110 is provided to transmit information through reflection of light and is made of a highly transparent material.

The cladding 120 is arranged in such a manner as to surround the core 110. The core 110 is easily contaminated, and thus, light is reflected. For this reason, the cladding 120 serves to protect the core 110 from being contaminated. The cladding 120 is made of a lower-reflective-index material than the core 110.

The jacket 130 is provided to protect the core 110 and the cladding 120 from being damaged, and is arranged in such a manner as to surround the cladding 120. If necessary, a buffer may be arranged between the cladding 120 and the jacket 130.

Figure 2:
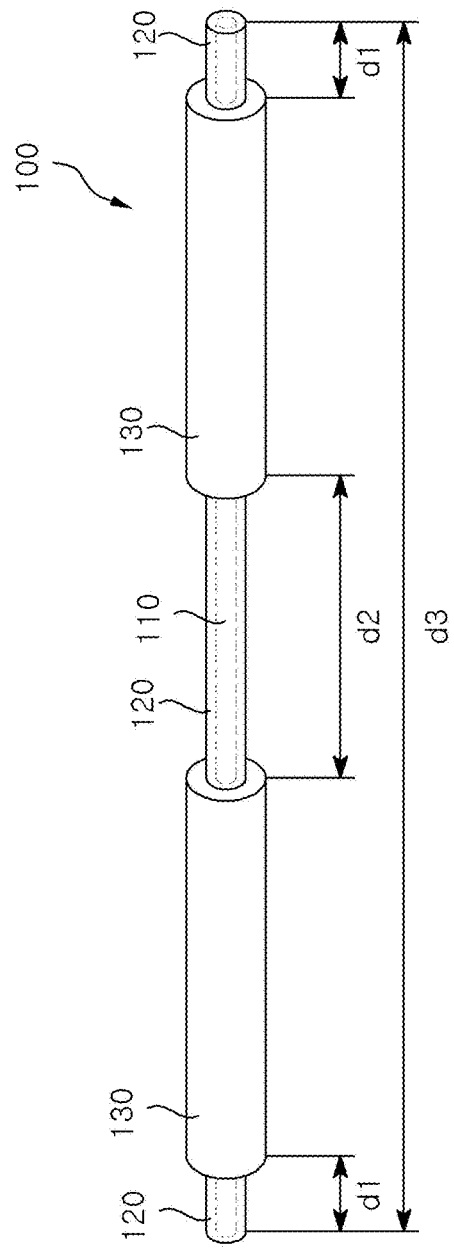
FIG. 2 is a view illustrating a state where a portion of an optical fiber is removed to manufacture the ring resonator according to the embodiment of the present disclosure.

The manufacturing of the ring resonator 10 using the optical fiber 100, as illustrated in FIG. 1, includes Step S101 of removing a jacket of an optical fiber, Step S103 of inserting a sleeve, Step S105 of connecting the optical fiber, Step S107 of inserting and fitting the sleeve, and Step S109 of etching a cladding.

First, the optical fiber 100 is prepared, and the jacket 130 is removed from a section of the optical fiber 100 (step S101).

The optical fiber 100 having a predetermined length d3 is prepared as illustrated in FIG. 2. For example, the optical fiber 100 may have a length of approximately 80 mm, and an SMF-28 optical fiber 100 may be used as the optical fiber 100.

Then, a portion of the jacket 130 is removed from both end portions of and a central portion of the prepared optical fiber 100. For example, approximately 5 mm of the jacket 130 is removed from each of the end portions d1 of the optical fiber 100 in such a manner that the cladding 120 is exposed to the outside. Approximately 20 mm of the jacket 130 is removed from the central portion d2 of the optical fiber 100 in such a manner that the cladding 120 is exposed to the outside.

As described above, a sleeve 140 is inserted into the optical fiber 100 from which the portion of the jacket 130 is removed (step S103).

Since the portion of the jacket 130 is removed, as illustrated in FIG. 2, two jackets 130 are arranged to be spaced apart from each other in the optical fiber 100. The sleeve 140 having a predetermined length d4 is inserted into the optical fiber 100 to surround a portion of the jacket 130 of the optical jacket 100.

Figure 3:
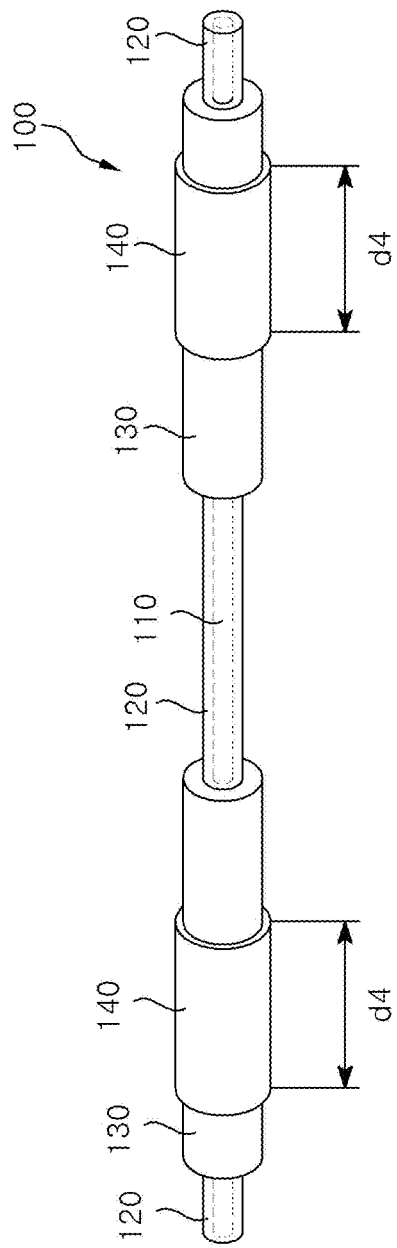
FIG. 3 is a view illustrating a state where a sleeve is inserted into the optical fiber to manufacture the ring resonator according to the embodiment of the present disclosure.

For example, the sleeve 140 may have a length of approximately 11 mm, and two sleeves 140 are inserted into the two jackets 130, respectively. Therefore, as illustrated in FIG. 3, the two sleeves 140 may be arranged on the two jackets 130, respectively, which are arranged in the optical fiber 100. At this point, the two sleeves 140 may be arranged at positions, respectively, which are symmetrical about the center of the optical fiber 100.

At this point, the sleeve 140 may be one that is used mainly in a splicing operation, and may be made of rubber or a plastic material.

When the sleeve 140 is inserted, both ends of the optical fiber 100 are connected to each other (step S105).

Figure 4:
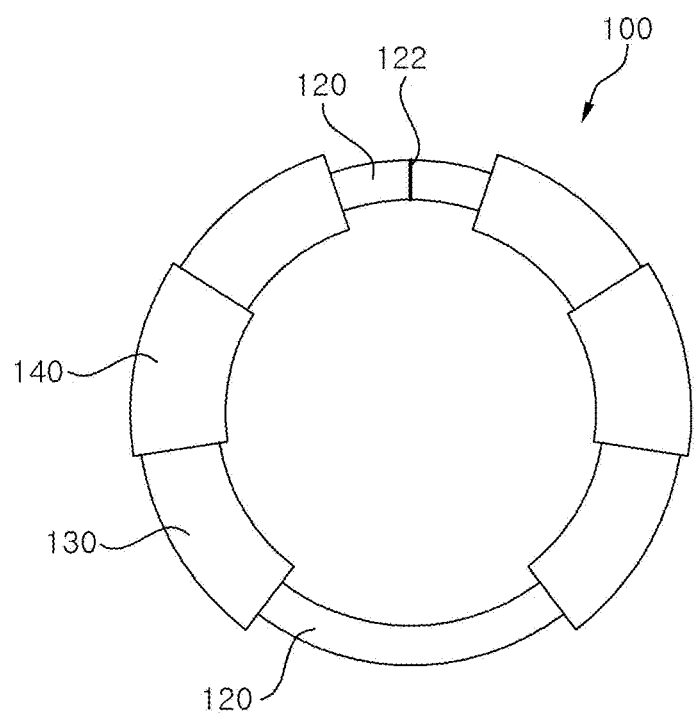
FIG. 4 is a view illustrating a state where the optical fiber is formed to have the shape of a ring to manufacture the ring resonator according to the embodiment of the present disclosure.

As illustrated in FIG. 4, the optical fiber 100 is transformed to have the shape of a ring in such a manner that both ends of the optical fiber 100 are brought into contact with each other, and then both ends of the optical fiber 100 are connected to each other. The both ends of the optical fiber 100 are connected to each other using a fusion slicer, and thus a splicing point 122 is formed.

At this point, the optical fiber 100 is formed to have the shape of a ring. Thus, the optical fiber 100 in the shape of a ring has a predetermined diameter. For example, the optical fiber 100 in the shape of a ring may have a diameter of approximately 25.5 mm.

The fusion slicer applies electric power to both ends of the optical fiber 100 using an electrode, and thus both ends thereof are connected to each other.

As described above, when both ends of the optical fiber 100 are connected to each other using the fusion slicer, a shrinking sleeve 142 is fitted (step S107).

Figure 5:
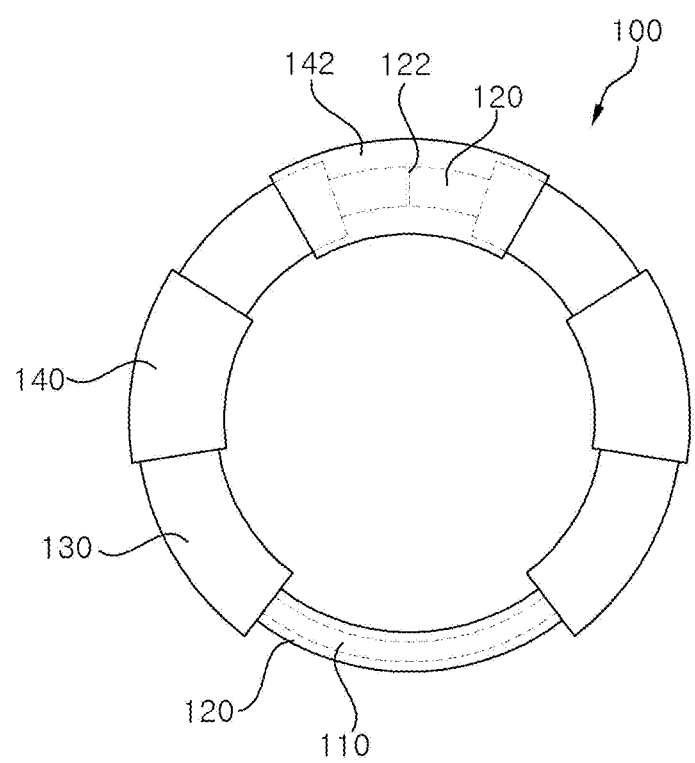
FIG. 5 is a view illustrating a state where a shrinking sleeve is fitted to the optical fiber to manufacture the ring resonator according to the embodiment of the present disclosure.

Although both ends of the optical fiber 100 are connected to each other using the fusion slicer, the splicing point 122 is more easily damaged than the other portions of the optical fiber 100. Therefore, as illustrated in FIG. 5, the shrinking sleeve 142 is arranged to surround the splicing point 122.

The shrinking sleeve 142 is arranged to partly overlap the jackets 130 that are arranged on both sides of the cladding 120 at a position where both ends of the optical fiber 100 are connected to each other. Therefore, both end portions of the shrinking sleeve 142 are brought into contact with the jackets 130 of the optical fiber 100, and connects the jackets 130 of the optical fiber 100 which are brought into contact with the shrinking sleeve 142. The heater source melts the shrinking sleeve 142, and thus the shrinking sleeve 142 is brought into contact with and fitted to the jackets 130 of the optical fiber 100.

When the shrinking sleeve 142 is connected in this manner to the optical fiber 100, the exposed cladding 120 is etched (step S109).

Figure 6:
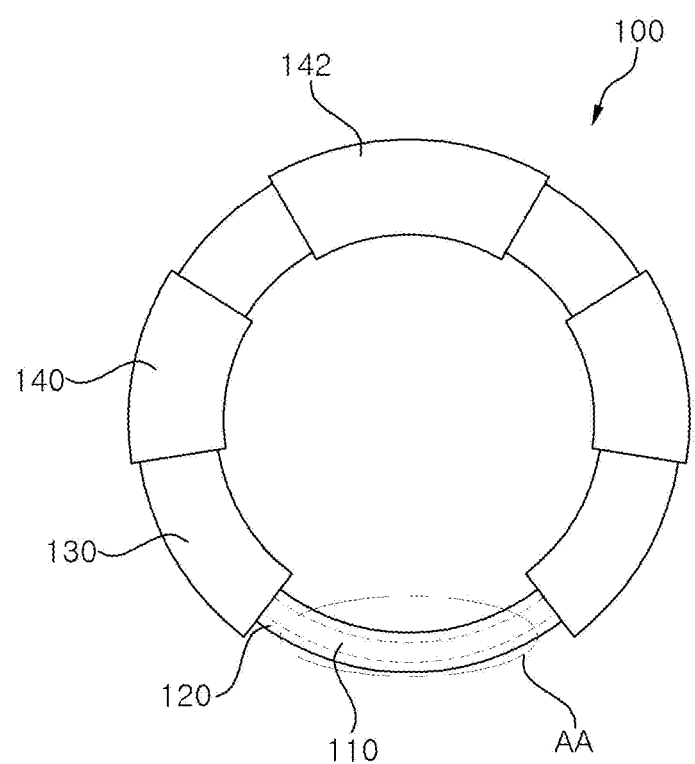
FIG. 6 is a view illustrating an area for etching cladding to manufacture the ring resonator according to the embodiment of the present disclosure.

When the shrinking sleeve 142 is fitted to the optical fiber 100, the cladding 120 may be exposed to the outside from a portion of the optical fiber 100 having a ring shape. As illustrated in FIG. 6, the cladding 120 is etched to expose the core 110 to the outside in a position where the cladding 120 is exposed in this manner to the outside.

The etching of the cladding 120 is performed using hydrofluoric acid. The cladding 120 is etched using approximately 200 µl of an aqueous solution of hydrofluoric acid having a concentration of 49%. In other words, an etching area "AA" in FIG. 6 may be an area where the cladding 120 in the optical fiber 100 having the ring shape is exposed to the outside. The etching of the cladding 120 is performed in a state where the aqueous solution of hydrofluoric acid that drops on the etching area "AA" is brought into contact with the cladding 120.

Figure 8:
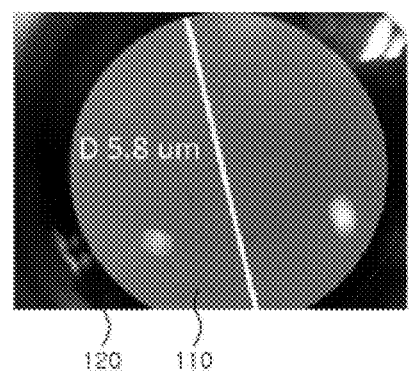
FIG. 8 is a photograph showing a cross section of the ring resonator according to the embodiment of the present disclosure.
Figure 9:
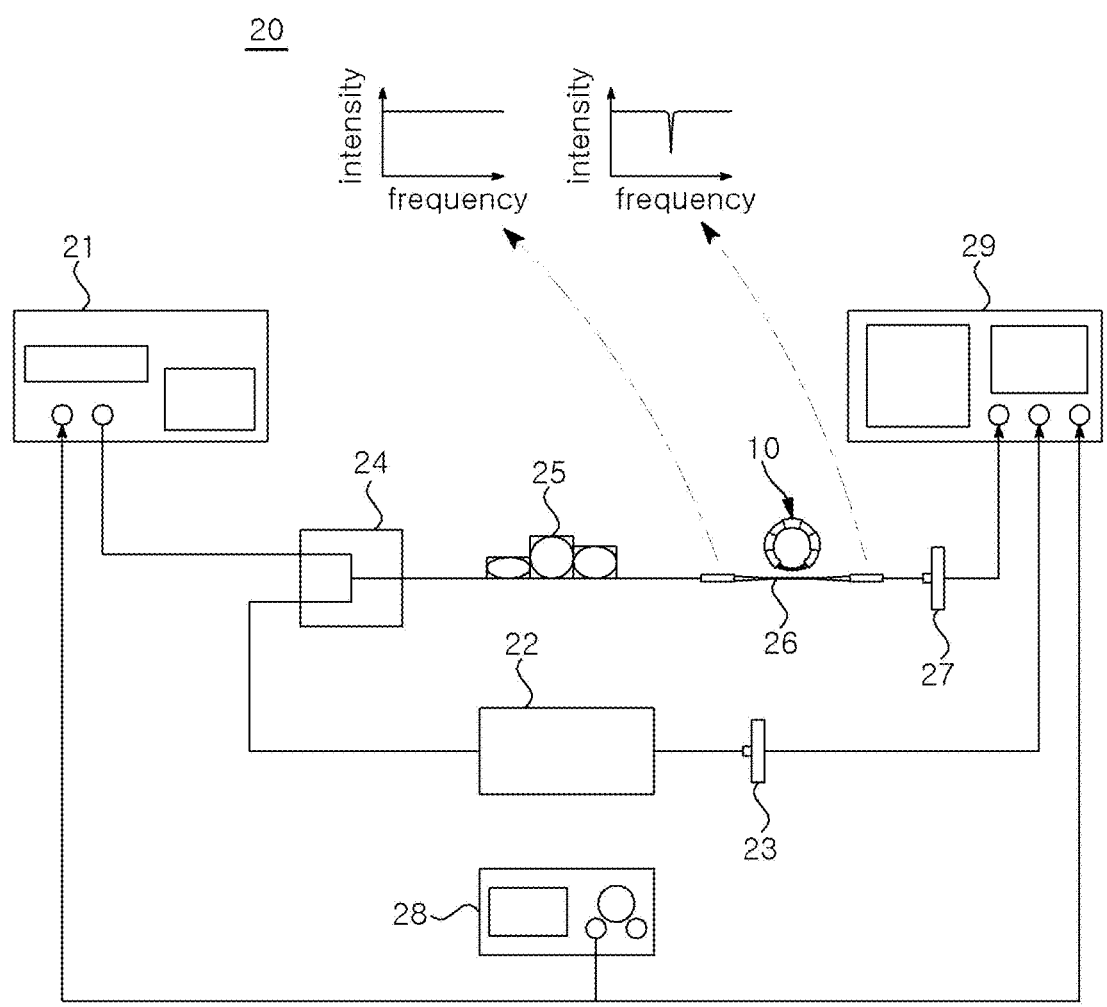
FIG. 9 is a view illustrating a measurement apparatus for measuring a Q factor of the ring resonator according to the embodiment of the present disclosure.

In this step, the etching of the cladding 120 is performed until the thickness of the etched thinnest portion of the exposed cladding 120 becomes 10 µm or less. For example, when the cladding 120 is brought into contact with the aqueous solution of hydrofluoric acid for approximately one hour, as illustrated in FIG. 8, a thickness of the thinnest portion of the cladding 120 exposed to the outside becomes approximately 5.8 µm.

Figure 7:
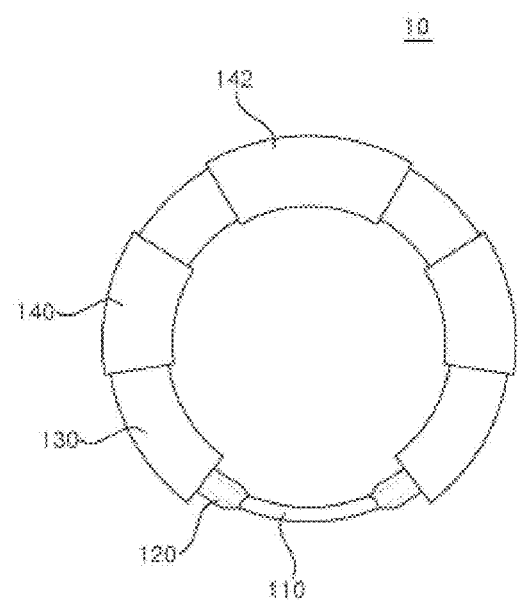
FIG. 7 is a view illustrating the ring resonator according to the embodiment of the present disclosure.

As described above, when the etching of the cladding 120 is completed, the manufacturing of the ring resonator 10 is finished as illustrated in FIG. 7.

The ring resonator 10 manufactured in this manner has a diameter in units of mm and can be used in a band of frequencies in units of giga.

The ring resonator 10 may have a substantially circular shape. The core 110 of the optical fiber 100 in a portion of the ring resonator 10 can be exposed to the outside. It can be seen that the two sleeves 140 are formed in the ring resonator 10 to surround the jacket 130.

By measuring a Q factor of the ring resonator 10, it can be verified whether or not the ring resonator 10 can be used in a band of frequencies in units of giga.

A measurement apparatus 20 that measures the Q factor of the ring resonator 10 includes a wavelength-variable laser-beam generator 21, a Mach-Zehnder interferometer 22, a first detector 23, a coupler 24, a polarization controller 25, a tapered optical fiber 26, a second detector 27, a waveform generator 28, and an oscilloscope 29.

The wavelength-variable laser-beam generator 21 generates a laser beam having a predetermined wavelength.

The Mach-Zehnder interferometer 22 generates a reference signal. The Mach-Zehnder interferometer 22 generates the reference signal using the laser beam generated by the wavelength-variable laser-beam generator 21.

The first detector 23 detects the reference signal generated by the Mach-Zehnder interferometer 22, and transmits the detected reference signal to the oscilloscope 29.

The coupler 24 splits the laser beam generated by the wavelength-variable laser-beam generator 21 into two laser beams, one for emission to the polarization controller 25 and the other for emission to the Mach-Zehnder interferometer 22.

The polarization controller 25 polarizes the laser beam generated by the wavelength-variable laser-beam generator 21 in such a manner that an evanescent wave is generated in the tapered optical fiber 26 using the laser beam generated by the wavelength-variable laser-beam generator 21. The evanescent wave is light that propagates along a boundary surface of a medium outside a surface where total reflection occurs.

The tapered optical fiber 26 carries the laser beam under the control of the polarization controller 25 and generates the evanescent wave. The tapered optical fiber 26 may have a predetermined length, and may be in a state where a portion of each of the jacket 130 and the cladding 120 is removed in such a manner that the core 110 is exposed to the outside.

Therefore, the evanescent wave generated in the tapered optical fiber 26 may be coupled back to the tapered optical fiber 26 through the ring resonator 10 and may be applied to the oscilloscope 29 through the second detector 27.

The second detector 27 detects a signal of the evanescent wave coupled to the tapered optical fiber 26 and transmits the detected signal to the oscilloscope 29.

The waveform generator 28 changes a frequency of the laser beam that is generated by the wavelength-variable laser-beam generator 21.

The oscilloscope 29 input signals that are received from the first detector 23 and the second detector 27, respectively.

Figure 10:
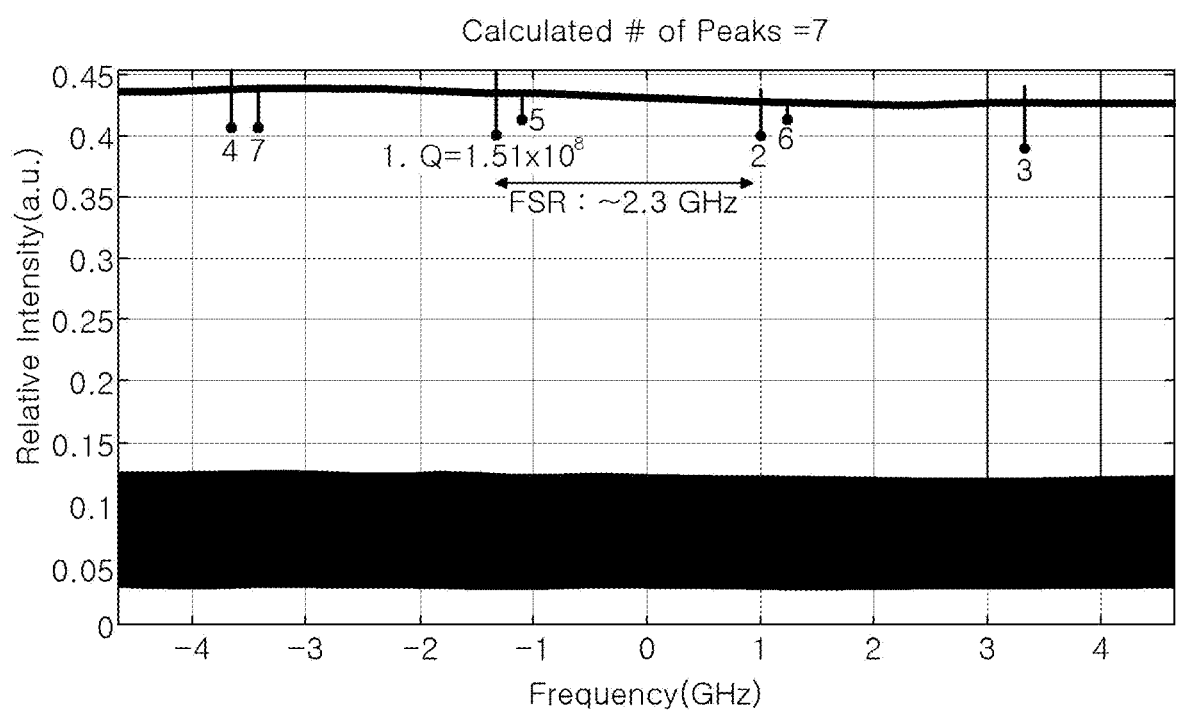
FIG. 10 is a graph showing a relative magnitude of the Q factor of the ring resonator according to the embodiment of the present disclosure.
Figure 11:
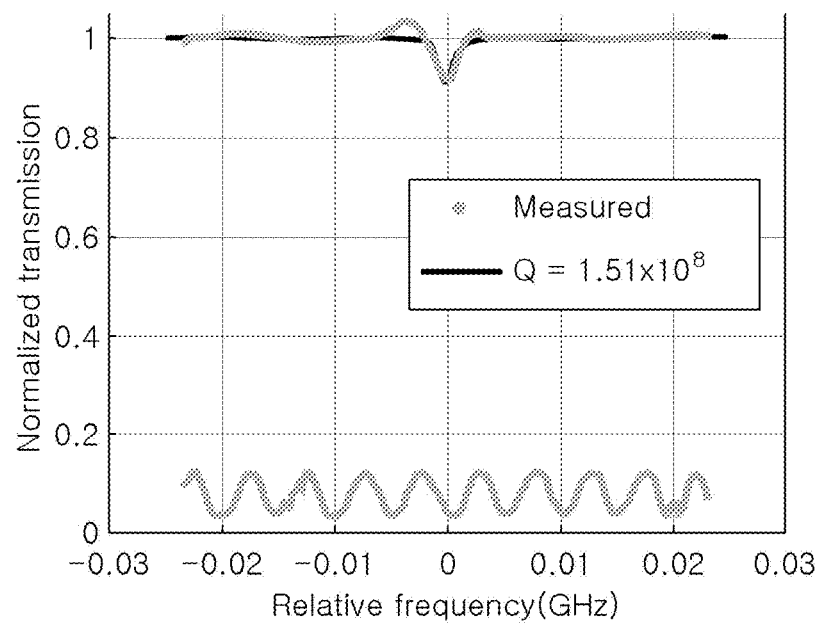
FIG. 11 is a graph showing the Q factor of the ring resonator according to the embodiment of the present disclosure.

As illustrated in FIGS. 10 and 11, as a result of measuring the Q factor of the ring resonator 10 through the above-described process, it can be verified that the ring resonator 10 has an ultrahigh Q factor value of approximately $10^8$. For example, through the measurement apparatus 20, it can be verified that the Q factor of the ring resonator 10 is approximately $1.51 \times 10^8$.

Various types of optical fibers 100 may be used as the optical fiber 100 that is used in the ring resonator 10 as described above. For example, the ring resonator 10 may be manufactured using one of a polarization-maintaining optical fiber 100 illustrated in FIG. 12, a multi-mode optical fiber 100 illustrated in FIG. 13, an erbium-doped optical fiber 100 illustrated in FIG. 14, a high non-linearity optical fiber 100 illustrated in FIG. 15, and a dispersion optical fiber 100 illustrated in FIG. 16.

Figure 12:
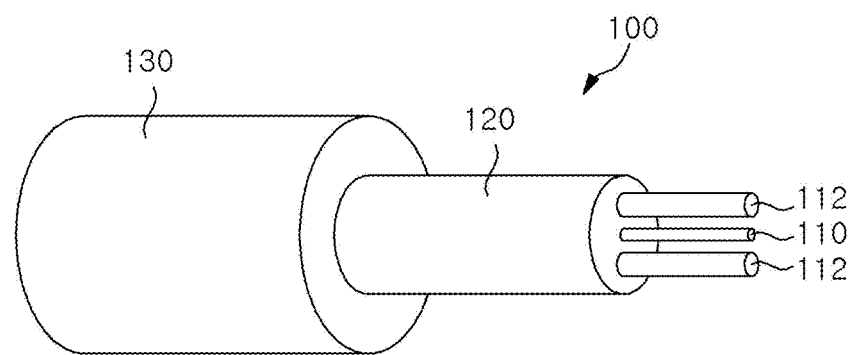
FIG. 12 is a view illustrating a first example of the optical fiber that is used in the ring resonator according to the embodiment of the present disclosure.

The polarization-maintaining optical fiber 100, as illustrated in FIG. 12, is a single mode optical fiber 100 that maintains linear polarization while carrying light. In the polarization-maintaining optical fiber 100, the core 110 is arranged between two polarization mode units 112. The polarization-maintaining optical fiber 100 has little or no cross-coupling of light power.

Figure 13:
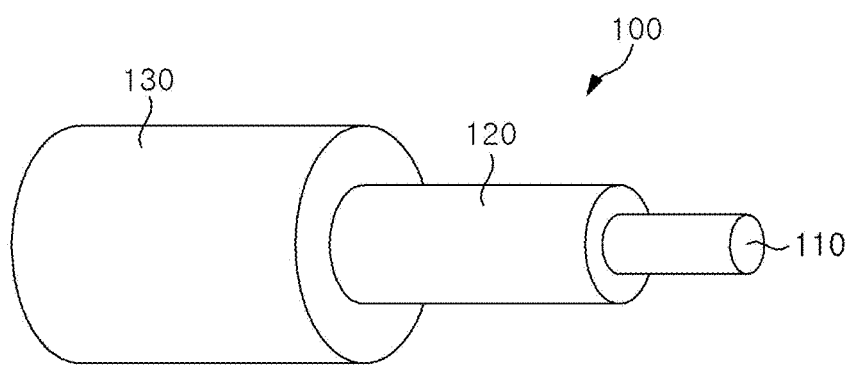
FIG. 13 is a view illustrating a second example of the optical fiber that is used in the ring resonator according to the embodiment of the present disclosure.

The core 110 of the multi-mode optical fiber 100, as illustrated in FIG. 13, has a relatively large diameter in such a manner that multiple light modes are supported while carrying light.

Figure 14:
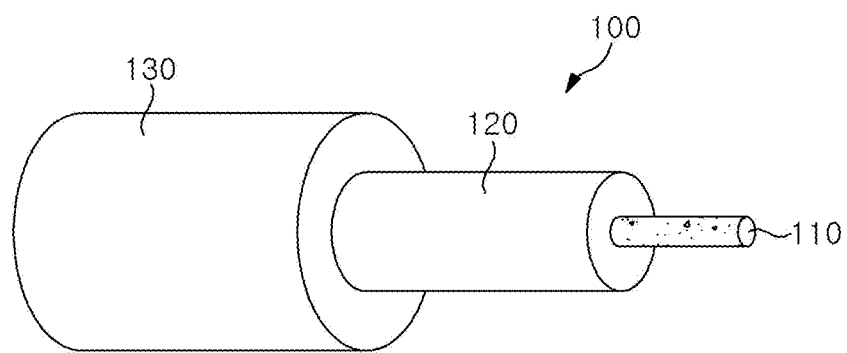
FIG. 14 is a view illustrating a third example of the optical fiber that is used in the ring resonator according to the embodiment of the present disclosure.

The erbium-doped optical fiber 100, as illustrated in FIG. 14, is used in an optical fiber amplifier, particularly in an erbium-doped optical fiber amplifier. The core 110 of the erbium-doped optical fiber 100 is doped with erbium. The core thereof may be doped with 980 nm or 1480 nm of erbium to generate a gain of approximately 1550 nm (C-Band) or approximately 1590 nm (L-Band).

Figure 15:
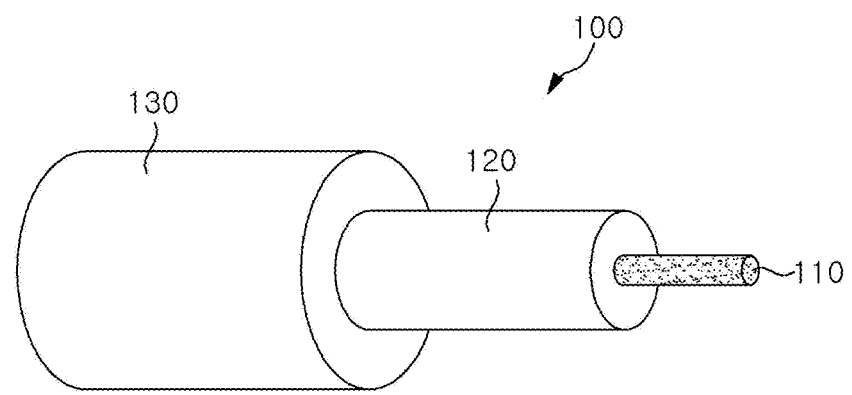
FIG. 15 is a view illustrating a fourth example of the optical fiber that is used in the ring resonator according to the embodiment of the present disclosure.

The high non-linearity optical fiber 100, as illustrated in FIG. 15, is designed in such a manner as to obtain a high nonlinear coefficient, and may be used in generating a supercontinuum.

Figure 16:
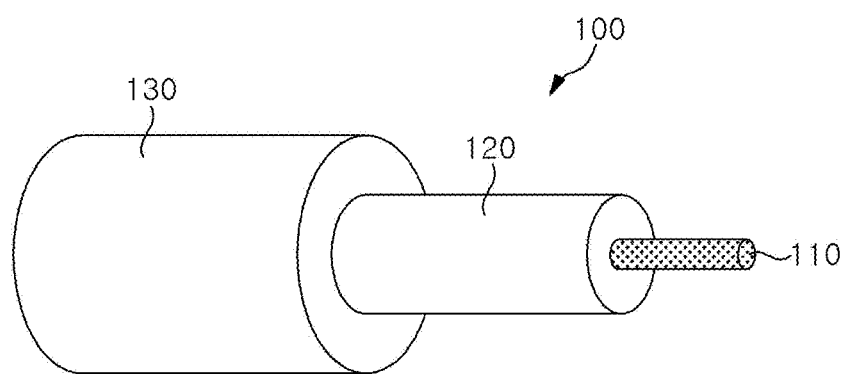
FIG. 16 is a view illustrating a fifth example of the optical fiber that is used in the ring resonator according to the embodiment of the present disclosure.

The dispersion optical fiber 100, as illustrated in FIG. 16, has a wide range of dispersion values, and is useful in generating the supercontinuum.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. A ring resonator, comprising:
   a core having two ends, wherein both ends of the core in a lengthwise direction are connected to have a circular shape;
   a cladding surrounding the core;
   a jacket surrounding the cladding;
   two sleeves, wherein each of the two sleeves surrounds a portion of the jacket; and
   a shrinking sleeve that is arranged to surround a portion where both ends of the core are connected to each other;
   wherein a portion of the core is exposed from the cladding and the jacket;
   wherein the shrinking sleeve is fitted to the jacket; and
   wherein the two sleeves are arranged at positions, respectively, which are symmetrical about the center of the ring resonator.

2. A method of manufacturing a ring resonator, comprising:
   removing portions of a jacket which are arranged on both ends and a central portion of an optical fiber, wherein the optical fiber includes a core having a predetermined length, a cladding surrounding the core, and the jacket surrounding the cladding;
   inserting two sleeves, each of which surrounds a remaining portion of the jacket;
   connecting both ends of the optical fiber;
   providing a shrinking sleeve to surround a portion where both ends of the optical fiber are connected; and
   etching the cladding arranged in the central portion of the optical fiber from which the portion of the jacket is removed;
   wherein the shrinking sleeve is fitted to the jacket; and
   wherein the two sleeves are arranged at positions, respectively, which are symmetrical about the center of the ring resonator.

3. The method of claim 2, wherein the etching of the cladding includes etching the cladding using an aqueous solution of hydrofluoric acid.

4. The method of claim 3, wherein the aqueous solution of hydrofluoric acid has a concentration of 49%.

5. The method of claim 3, wherein, in the etching of the cladding, the cladding is etched so that the remaining cladding surrounding the core has a diameter of 10 μm or less.

6. The method of claim 2, wherein the optical fiber has a length of 80 mm, each of the portions of the jacket that are removed at the both ends of the optical fiber has a length of 5 mm, and the portions of the jacket that is removed at the central portion of the optical fiber has a length of 20 mm.

7. The method of claim 2, wherein each of the two sleeves has a length of 11 mm.

* * * * *